United States Patent
Ebrahimi Afrouzi

(10) Patent No.: US 12,441,546 B1
(45) Date of Patent: Oct. 14, 2025

(54) AUTONOMOUS MOBILE ROBOTIC DEVICE FOR THE TRANSPORTATION OF ITEMS

(71) Applicant: Ali Ebrahimi Afrouzi, Henderson, NV (US)

(72) Inventor: Ali Ebrahimi Afrouzi, Henderson, NV (US)

(73) Assignee: AI Incorporated, Toronto (CA)

( * ) Notice: Subject to any disclaimer, the term of this patent is extended or adjusted under 35 U.S.C. 154(b) by 0 days.

(21) Appl. No.: 18/788,649

(22) Filed: Jul. 30, 2024

Related U.S. Application Data

(63) Continuation of application No. 17/535,965, filed on Nov. 26, 2021, now Pat. No. 12,060,227, which is a continuation of application No. 16/127,038, filed on Sep. 10, 2018, now Pat. No. 11,214,437.

(60) Provisional application No. 62/594,136, filed on Dec. 4, 2017, provisional application No. 62/558,278, filed on Sep. 13, 2017.

(51) Int. Cl.
*G06F 7/00* (2006.01)
*B25J 9/16* (2006.01)
*B25J 13/00* (2006.01)
*B65G 1/137* (2006.01)

(52) U.S. Cl.
CPC .......... *B65G 1/1373* (2013.01); *B25J 9/1666* (2013.01); *B25J 13/006* (2013.01)

(58) Field of Classification Search
CPC ...... B65G 1/1373; B65G 1/1375; B65G 1/00; B25J 9/1666; B25J 13/006; G05D 1/0212; G05D 2201/0216; G05D 1/0278; B23Q 7/1436; G06Q 10/08; G06Q 10/087; G01C 21/38; G01C 21/3804; G01C 21/3811; G01C 21/34; G01C 21/3492; G01C 21/36; G06F 16/29
USPC .................. 700/213–214, 228–229
See application file for complete search history.

(56) References Cited

U.S. PATENT DOCUMENTS

| | | |
|---|---|---|
| 5,409,347 A | 4/1995 | Suzuki |
| 7,556,108 B2 | 7/2009 | Won |
| 9,492,922 B1 * | 11/2016 | Johnson ............... G05D 1/0297 |
| 9,561,941 B1 | 2/2017 | Watts |
| 9,827,683 B1 | 11/2017 | Hance |
| 9,939,814 B1 * | 4/2018 | Bauer .................. G05D 1/0274 |
| 10,303,171 B1 | 5/2019 | Brady |
| 10,493,624 B1 | 12/2019 | Nabat |
| 2013/0035790 A1 | 2/2013 | Olivier, III |
| 2015/0202770 A1 | 7/2015 | Patron |
| 2015/0306761 A1 | 10/2015 | O'Connor |
| 2016/0282126 A1 | 9/2016 | Watts |
| 2017/0017236 A1 | 1/2017 | Song |
| 2017/0057087 A1 | 3/2017 | Lee |

(Continued)

FOREIGN PATENT DOCUMENTS

| | | |
|---|---|---|
| CA | 1252430 A | 6/1984 |
| JP | 3601737 B2 | 12/2004 |

*Primary Examiner* — Yolanda R Cumbess

(57) ABSTRACT

An autonomous mobile robotic device that may carry and transport one or more items within an environment. The robotic device may comprise a container within which the one or more items may be stored. The robotic device may pick up and deliver the one or more items to one or more locations. The robotic device may be provided with scheduling information for task execution or pickup and delivery of one or more items. Once tasks are complete, the robotic device may autonomously navigate to a storage location.

30 Claims, 4 Drawing Sheets

(56) References Cited

U.S. PATENT DOCUMENTS

| | | |
|---|---|---|
| 2018/0021954 A1 | 1/2018 | Fischer |
| 2018/0039835 A1 | 2/2018 | Rajkumar |
| 2018/0053141 A1 | 2/2018 | Shydo, Jr. |
| 2018/0060765 A1 | 3/2018 | Hance |
| 2018/0136651 A1* | 5/2018 | Levinson ............. G05D 1/0027 |
| 2019/0155275 A1 | 5/2019 | Akamatsu |
| 2019/0243383 A1 | 8/2019 | Cantrell |

* cited by examiner

FIG. 2a
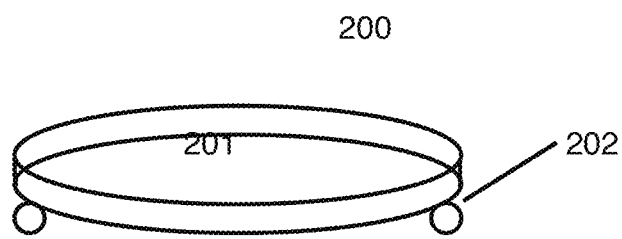
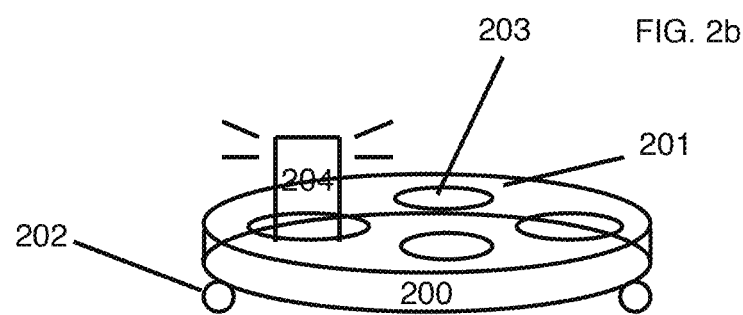
FIG. 2b

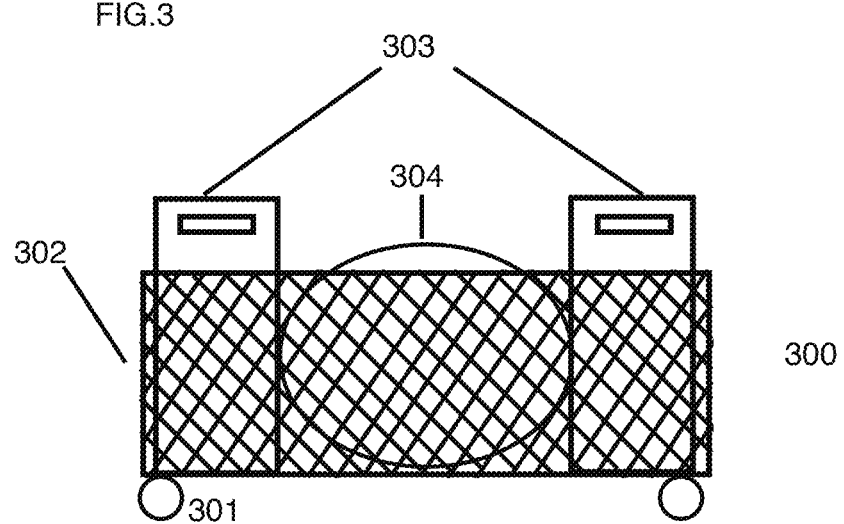

AUTONOMOUS MOBILE ROBOTIC DEVICE FOR THE TRANSPORTATION OF ITEMS

CROSS-REFERENCE TO RELATED APPLICATIONS

This application is a Continuation of U.S. Non-Provisional patent application Ser. No. 17/535,965, filed Nov. 26, 2021, is a Continuation of U.S. Non-Provisional patent application Ser. No. 16/127,038, filed Sep. 10, 2018, which claims the benefit of Provisional Patent Application Nos. 62/558,278, filed Sep. 13, 2017 and 62/594,136, filed Dec. 4, 2017, each of which is hereby incorporated by reference. In this patent, certain U.S. patents, U.S. patent applications, or other materials (e.g.) articles) have been incorporated by reference. Specifically, U.S. application Ser. Nos. 16/051, 328, 15/272,752, 62/661,802, 62/631,050, 15/951,096, 15/447,450 and 15/981,643 are hereby incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

The present invention relates to robotic devices in general, and more particularly to mobile robotic devices for carrying and transporting items.

BACKGROUND

Mobile robotic devices are becoming increasingly common in consumer homes and commercial spaces. In several instances, mobile robotic devices are desirable for the convenience and efficiency they provide. For example, autonomous mobile robotic devices that perform specific tasks such as vacuuming, mopping, mowing, and the like provide convenience to a user as the tasks may be completed by the mobile robotic device without or with minimal human intervention.

A mobile robotic device that may carry and transport items may also be useful. For example, a mobile robotic device that may autonomously carry and transport a refuse container back and forth between a storage location and refuse collection location at scheduled times may be useful. In another example, a mobile robotic device that may carry and transport a voice-activated home assistant, such as Google Assistant or Amazon Alexa may be useful as it may provide a user with continuous access to the home assistant as they maneuver around an environment. In many other instances, a mobile robotic device that may autonomously transport one or more items such as a bike, remote control, speakers, food, laptop, cell phone, robotic devices or other types of devices, or any other item may also be desirable.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Some aspects include a mobile robotic device that may autonomously carry and transport items within an environment comprising a chassis including a set of wheels, a motor for driving the set of wheels, a suspension system, a rechargeable battery for providing power to the device, a control system module for controlling the movement of the device, a processor, and a set of sensors. In some embodiments, the mobile robotic device further comprises a platform on which items may be placed. In some embodiments, the mobile robotic device may also comprise additional components such as a mapping module for the mapping the environment, a localization module for locating the robotic device within its environment, a scheduling module for setting a schedule for one or more operations, a path planning module for route planning, or any other type of component that may be useful to the robotic device in carrying out its intended function.

BRIEF DESCRIPTION OF THE DRAWINGS

Non-limiting and non-exhaustive features of the present invention are described and depicted with reference to the following figures, wherein like reference numerals refer to like parts throughout the various figures.

FIG. 2A illustrates an example of a robotic device comprising a platform, according to some embodiments.

FIG. 2B illustrates an of a robotic device comprising a platform with cavities, according to some embodiments.

FIG. 3 illustrates an example of a robotic device comprising a container in which items are placed, according to some embodiments.

DETAILED DESCRIPTION OF SOME EMBODIMENTS

Figure 1:
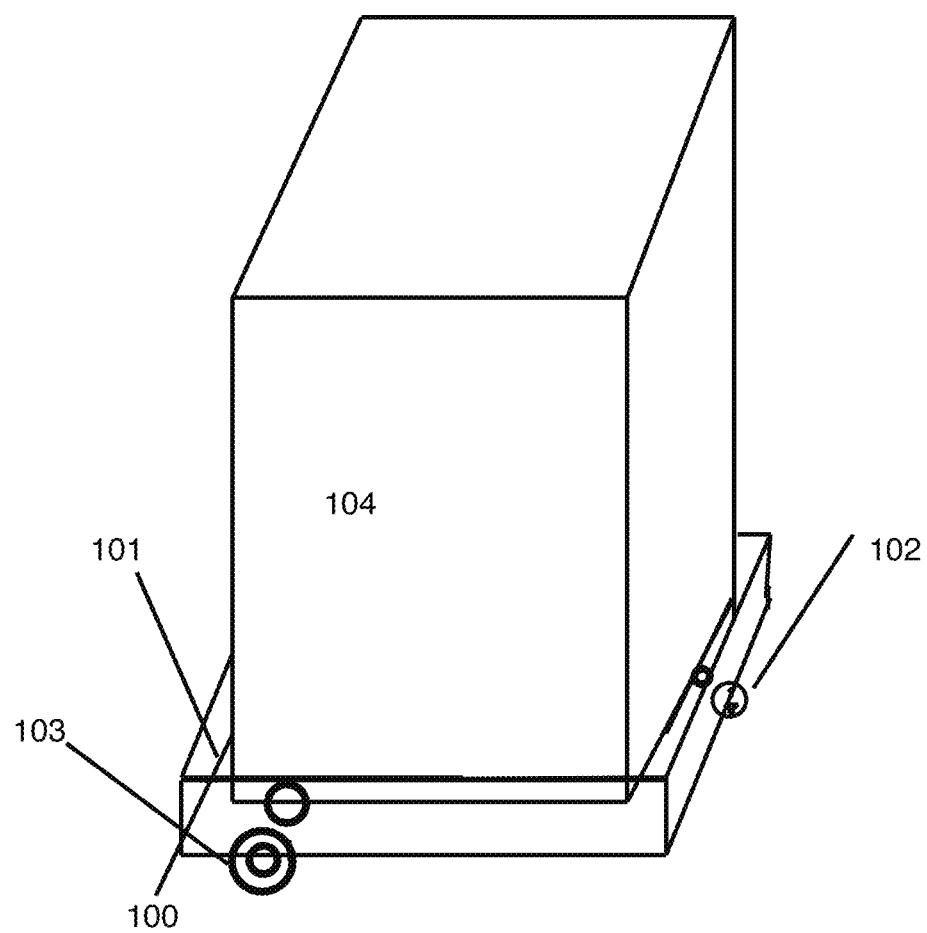
FIG. 1 illustrates an example of a robotic device carrying an item, according to some embodiments.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that include a computer-readable medium on which computer-readable instructions for carrying out embodiments of the inventive technique are stored. The computer-readable medium may include semiconductor, magnetic, opto-magnetic, optical, or other forms of computer-readable medium for storing computer-readable code. Further, the invention may also cover apparatuses for practicing embodiments of the invention. Such apparatus may include circuits, dedicated and/or programmable, to carry out tasks pertaining to embodiments of the invention. Examples of such apparatus include a computer and/or a dedicated computing device when appropriately programmed and may include a combination of a computer/computing device and dedicated/programmable circuits adapted for the various tasks pertaining to embodiments of the invention.

As understood herein, the term "robot", "device" or "robotic device" may be defined generally to include one or more autonomous devices having communication, mobility, and/or processing elements. For example, a robot or robotic device may comprise, but is not limited to, a casing or shell, a chassis including a set of wheels, a motor to drive wheels, a receiver that acquires signals transmitted from, for example, a transmitting beacon, a transmitter that transmits signals, a processor, and/or controller that processes and/or controls the motor and other autonomous robotic functions and/or operations, network or wireless communications, power management, etc., and one or more clock or synchronizing devices. In embodiments, the mobile robotic device may further comprise a platform on which items may be placed. In some embodiments, the mobile robotic device may also comprise additional components such as a mapping module for the mapping the environment, a localization module for locating the robotic device within its environment, a scheduling module for setting a schedule for one or more operations, a path planning module for route planning, or any other type of component that may be useful to the robotic device in carrying out its intended function.

As understood herein, the term "user" or "users" may be defined generally to include any entity that utilizes the mobile robotic device including humans, other mobile robotic devices, control systems, and the like.

Embodiments of the invention propose an autonomous mobile robotic device that may carry and transport items within an environment. The robotic device may comprise, but is not limited to, a set of wheels, a power source, a chassis, a suspension system, a rechargeable battery, a control module, and a processor. In embodiments, the robotic device may further comprise a platform on which items may be placed for transportation. In some embodiments, the robotic device may further comprise a user interface for, for example, adjusting settings, choosing functions, scheduling tasks, etc., a mapping module for mapping the environment using mapping techniques such as SLAM, and mapping tools such as imaging devices, sonar devices, LIDAR and LADAR devices, structured light devices, stereo vision and the like. In some embodiments, the robotic device may further comprise a localization module. Cameras, LIDAR, LADAR, stereo imaging, signal detectors and receivers, gyroscope, optical encoder, optical flow sensor, TOF sensors, depth sensors and other devices may be used to capture information that the processor of the robotic device may use to localize itself within an internal map of the working environment. In some embodiments, the processor of the robotic device may use machine learning techniques to learn the most optimal route for transporting an item from a first location to a second location and so forth. Various observations may be collected during operation in order to determine the most optimal path for the robotic device when transporting the item(s). For example, observations such as number of collisions, travel time, number of stalls, and travel distance may be used in determining the most optimal path. In some embodiments, the robotic device may have a wireless module to wirelessly send and receive information, such as a Wi-Fi module, a Bluetooth module, a RF module and the like. In some embodiments, the robotic device may comprise a scheduling module for, for example, setting a schedule for transportation of items. This may include the day, time, frequency, transportation time to a specific location, and the like. In embodiments, the robotic device may have voice-activated capabilities.

In some embodiments, the autonomous robotic device may carry and transport items within an environment, such a consumer home or commercial establishment. For example, the robotic device may carry and transport a home assistant such as Google Assistant or Amazon Alexa around a consumer home such that a user may have continuous access to the assistant. In another example, the robotic device may carry and transport a speaker system to a specific room within an environment. In some embodiments, the robotic device may transport other items such as, a laptop, a refuse container, a recycling bin, a remote control, robotic devices or other types of devices, food and drinks, with an environment. In some embodiments, the robotic device may pick up and deliver items from and to a specific location within an environment. For example, the robotic device may pick up a food delivery from a first location and transport the food to a second location. In another example, the robotic device may pick up an item purchased online by a user from a warehouse or store and deliver it to the user. In some embodiments, items may be stored on the robotic device or a platform of the robotic device. In some instances, the robotic device may be stored in at least one specific location until the robotic device is provided with instructions to transport the item to one or more particular locations and/or until executing a scheduled command. For example, the robotic device may store a refuse container in specific location and transport the refuse container to a refuse collection location at specific times. In another example, stock of a warehouse may be placed on the robotic device and stored in a particular location until the stock is required at which point the robotic device may transport the stock to a loading dock for loading. In some embodiments, an item may be placed on the robotic device by, for example, the robotic device, a user, another robotic device or a machine. In some embodiments, the item(s) placed on top the platform may be collected from at least one predetermined location at at least one predetermined date and time that may or may not be recurring on a, for example, weekly or bi-weekly basis. For example, at corporate establishments and/or consumer homes refuse waste or recycling bins may be collected on a recurring weekly or bi-weekly basis and at such times the robotic device may autonomously transport the refuse or recycling bin to the predetermined collection location. In some embodiments, items may be transported for delivery at specific times to one or more locations. For example, office supplies may be picked up from a stockroom or warehouse or store and delivered to one or more establishments for replenishing paper, toner, pens, paperclips and the like. In some embodiments, after distributing or delivering an item or completing a work task, the robotic device may autonomously navigate back to a designated storage location.

In some embodiments, scheduling information for the pickup, transportation and/or delivery of items may be provided to the processor of the robotic device using a mobile communication device with a graphical user interface, remote control, a user interface on the robotic device, or another type of device that may communicate with the processor of the robotic device. For example, a graphical user interface such as that described in U.S. patent application Ser. Nos. 15/272,752, 62/631,050, and 62/661,802, hereby incorporated by reference in their entirety, may be used for entering scheduling information. In some embodiments, a method for providing scheduling information to a robotic device such as that described in U.S. patent application Ser. No. 16/051,328, hereby incorporated by reference in its entirety, may be used. In some embodiments a web application, mobile application or software may be used for scheduling and sending scheduling information to the processor of the robotic device. In some embodiments, scheduling information may be sent to the processor of the robotic device using Wi-Fi, Bluetooth, RF, or other types of wireless connections. In some embodiments, auditory instructions may be provided to the robotic device by, for example, a user, specialized computer, robotic device, or control system. For example, a user may command the robotic device to transport a particular item such as a laptop, robotic device or other types of devices, remote control, home assistant, or other type of home or office item. In some embodiments, the robotic device may comprise a microphone module to receive voice commands.

In some embodiments, one or more commands may be provided to the processor of the robotic device by, for example, a user, another robotic device, a control system, a specialized computer, etc. In embodiments, the command may be provided to the processor using verbal commands, a mobile application and/or web application and/or software, a communication device with a graphical user interface paired with the robotic device, and/or a user interface on the robotic device. For example, a user may verbally command the robotic device to carry and transport an internet router such that it is within a predetermined range of the user whenever the user is home. In some embodiments, a communication device or an application of a communication device may be used to command the robotic device to transport an item such that, for example, the item remains within a predetermined range of the communication device. In other embodiments, a mobile application of a communication device, such as a smartphone, paired with the robotic device may autonomously initiate the robotic device to execute a command when the communication device is within a predetermined range of the robotic device. In other embodiments, information gathered by sensors of the robotic device may be used to initiate a particular action of the robotic device. For example, upon sensing the shower being turned on, the robot device may pick up and transport a newspaper to the kitchen table. As a further example, upon sensing the front door of a house opening the robotic device may transport a speaker system such that the speaker system remains in the same room as an owner.

In some embodiments, commands and/or instructions for one or more robotic devices may be set within a control system of the one or more robotic devices. In some embodiments, preferences or instructions corresponding to a particular user may be set within the control system. In embodiments, the control system may instruct a robotic device to execute a particular task when a particular user becomes present within an environment. For example, upon a particular user entering a work environment, the control system may instruct the robotic device to transport a work assistant device such that the work assistant device remains within a predetermined distance from the user. In another example, the robotic device can play music or can interact with the user verbally or follow the user around a work environment when the user enters the work environment. In some embodiments, the control system may detect a user using sensors, cameras, or the like, or may be made aware that a user has entered an area of the environment by a signal sent from a communication device paired with the control system, the robotic device, or other control system. A communication device may comprise a mobile device, tablet, laptop, remote control, etc.

In some embodiments, the robotic device may comprise a platform. FIG. 1 illustrates an example embodiment of a robotic device 100 including a platform 101 with a short lip providing a short cavity into which items such as box 104 may be placed. In this example, a front caster 102 is utilized along with rear wheels 103 which may be mecanum wheels. In FIG. 1, the robotic device is a rectangular device. Variations of the robotic device are possible, such as, removal of the caster or the robotic device being in a shape other than that of a rectangle. In embodiments, the platform may be a flat surface on which items may be placed. FIG. 2A illustrates another example of an embodiment in which robotic device 200 includes a flat platform 201. In FIG. 2A, the robotic device is circular in shape and only utilizes wheels 202 rather than including an additional caster wheel, as was included in the example embodiment of FIG. 1. Variations are possible, such as for example, including a caster wheel or the robotic device being in a shape other than that of a circular shape. In some embodiments, the platform may be a top surface of the robotic device or may be a separate component attached to the robotic device. In some embodiments, cavities in the surface of the device in which items may be securely placed may exist. For example, slotted cavities in the surface of the robotic device may be present where a mobile router or smart device such as, for example, Amazon Alexa or Google Assistant may be placed securely. FIG. 2B illustrates an example of an embodiment in which robotic device 200 is circular and includes a flat platform 201 including slotted cavities 203. In FIG. 2B, an internet router 204 is an example of an item to be placed in a cavity. In this example, robotic device 200 utilizes a predetermined number of a set of wheels 202. Variations are possible, such as for example, the number, shape, depth, and size of cavities and the like. In other embodiments, the platform may be of a different shape, such as rectangular box container in which items may be placed. FIG. 3 illustrates an example of an embodiment in which robotic device 300 includes a container in which items may be placed. Container walls 302 are comprised of a mesh material through which a user can see what is stored. In this example, groceries, such as grocery bags 303 and watermelon 304, are contained within the container. In this example, robotic device 200 utilizes a set of four wheels 301. Variations are possible, such as for example, the number of wheels or the material of the container walls or a container lid to seal the items within the container. In some embodiments, items may be placed onto and/or removed from the platform by a user, machine or other robotic device. In some embodiments, the robotic device may further comprise a component, such as an arm module, for grabbing and/or lifting items. In other embodiments, the robotic device may comprise other components capable of grabbing and/or lifting items. In some embodiments, the items placed on the platform may be secured in place using a locking mechanism of the robotic device including but not limited to, for example, straps, locks, pressurized clamps, and the like. In embodiments, the shape of the robotic device for carrying and/or transporting items may be round, ovoid, rectangular, triangular and the like. The figures listed above are intended solely for the purpose of illustrating examples of the present invention. These figures are merely examples and are not intended to limit the scope, shape or design of the present invention to the illustrations provided above. Other designs are possible without deviating from the scope of the invention.

In some embodiments, the robotic device may further comprise a component for providing electricity to items carried and transported by the robotic device. For example, the robotic device may comprise an electrical socket, a smartphone charging port, a home assistant charging port, or other types of connectors that may provide items with electricity. In some instances, electricity may be required for items being carried and transported. For example, a robotic device may carry and transport a music speaker that requires electricity to play music around an environment such that the music speaker remains close to a user to provide them with constant music. In another example, a robotic device may carry and transport a router that requires electricity around an environment such that the router remains close to a user to provide them with a strong internet connection. In such situations, the robotic device may be able to provide these items with electricity using a rechargeable battery of the robotic device, a rechargeable battery separate from the main rechargeable battery of the robotic device, solar energy, and the like.

In embodiments, the processor of the robotic device may learn a path, such as a path between a first location and a second location, in a variety of ways. In some embodiments, the robotic device may be taught a path by directing the robotic device along the desired path by physically moving the robotic device or by using a remote control or an application of a communication device paired with the robotic device. Other methods of moving the robotic device along the desired path may also be used. For example, the robotic device may be taught a path between the first location by physically wheeling the robotic device from the first location, through the environment, to the second. In some embodiments path learning may be initiated by, for example, a user pressing a start button on the robotic device or on any other device capable of communicating with the robotic device, voice activation or autonomously upon startup. In some embodiments, path learning may be completed by, for example, pressing an end button on the robotic device or on any other device capable of communicating with the robotic device, voice activation, or autonomously upon detecting no movement of the robotic device. Path learning may be initiated when the robotic device is positioned at the first location of the robotic device and completed after the robotic device has navigated along the desired path to the second location. In embodiments, there may be multiple locations along the path between the first and second location in which the robotic device may stop. In some embodiments, wherein the path of the robotic device comprises driving one way along a path and returning back in the same way along the same path, path learning may be initiated when the robotic device is positioned at the first location and completed after the robotic device has navigated to the location in which the robotic device it to turn around and return back along the same path to the first location. Alternatively, in some embodiments, path learning may be initiated and completed using an application of a communication device, such as a mobile device, laptop or smart phone, capable of communicating with the robotic device. In some embodiments, an application of a communication device may be used to mark a path of the robotic device within a map of the environment that may be shared with the robotic device. During path learning, the processor of the robotic device may determine its location within an internal map of the environment while simultaneously mapping the environment. In some instances, the processor of the robotic device may mark observed obstacles in the working environment within an internal map of the environment.

In some embodiments, a memory of the robotic device may contain an internal database of obstacles likely to be encountered within the working environment. In embodiments, an obstacle encountered in the work environment may be identified using various sensors to capture features of the obstacle and the processor to determine the type of obstacle based on the internal database. The processor of the robotic device may note the increased likelihood of that type of obstacle being located in the region of the environment in which it was encountered. For example, if a robotic device encounters a hose on the ground, image sensors of the robotic device may capture features of the hose and the processor may determine it is a hose based on an internal database of obstacles and their features. The processor of the robotic device may mark the region in which the hose was encountered within an internal map as a region with increased likelihood of containing a hose. In some embodiments, the processor may further determine if an obstacle may be overcome by the robotic device. For example, the processor may determine if the hose is an obstacle that may be overcome by the robotic device by driving over the hose. If so, the robotic device may attempt to drive over the obstacle. If, however, the robotic device encounters a large obstacle, such as a planter, the processor may determine that it cannot overcome the obstacle and may attempt to maneuver around the obstacle. In some embodiments, regions wherein obstacles are consistently encountered may be classified by the processor of the robotic device as a high traffic area and may be marked in a map of the environment. In some embodiments, the processor of the robotic device may attempt to alter its path in order to avoid high traffic areas. In some embodiments, the robotic device may carry and transport an obstacle to a location and may unload the obstacle.

In embodiments, the processor of the robotic device may generate multiple maps of the working environment over multiple working sessions. The maps may be stored in a memory of the robotic device and may be combined with previously generated maps using a processor of the robotic device to keep the map of the working environment up to date. In some embodiments, a predetermined map of the working environment may be generated and stored in an internal memory of the robotic device. In some embodiments, the robotic device may generate a map of the environment during operation in the environment. In embodiments, the processor of the robotic device may update the internal map of the environment with the observations collected during each successive work session. Continuous updates to the map of the environment may help establish the most efficient path of the robotic device.

In some embodiments, the robotic device may alert the user when an unanticipated obstacle blocking the path of the robotic device is encountered, particularly when the robotic device may not overcome the obstacle by maneuvering around or driving over the obstacle. The robotic device may alert the user by generating a noise, sending a message to an application of a communication device paired with the robotic device or any other device paired with the robotic device, displaying a message on a screen of the robotic device, illuminating lights, and the like. In some embodiments, the robotic device may be instructed to carry and transport the obstacle to a particular location and in some cases, unload the obstacle using an application of a communication device paired with the robotic device or any other device paired with the robotic device, a web application, or other types of communication methods.

In some embodiments, a control system responsible for managing item pick up, transport, distribution and/or delivery may transmit a signal to a receiver of the robotic device to notify the processor of the robotic device of the day and time of item pick up, transport, distribution and/or delivery. In some embodiments, a signal received by the receiver may indicate immediate transport of a particular item to a specific location. The signal may be a Wi-Fi signal, Bluetooth signal, RF signal, or other type of wireless signal. In some embodiments, a control system, may broadcast a signal to one or more robotic devices to notify the one or more robotic devices that it is time for an item to be picked up, transported, distributed and/or delivered at which point each mobile robotic device within the area may execute their respective task. In some embodiments, the control system may broadcast a signal to notify the one or more robotic devices that they may navigate to their respective storage location or to another location after, for example, task completion. Alternatively, in some embodiments, a barcode or other type of identification tag located on the robotic device may be scanned by a scanner after item pick up, distribution, delivery and/or transportation in order to alert the robotic device that it may navigate back to its storage location or another location. In other embodiments, other methods of alerting the robotic device that pick up, distribution, delivery and/or transportation is complete and that it may navigate back to its storage location or another location, such as, voice activation or activating a button on an interface of the robotic device may be used. In some embodiments, a control system responsible for the work tasks of the one or more robotic devices may monitor the location of the one or more robotic devices or users interacting with the one or more robotic devices in real-time using sensors such as cameras, microphone module, etc. For example, the control system may send a signal to a robotic device of a user to execute a particular task after observing the user entering their home. In some embodiments, the control system may provide commands or instructions to the one or more robotic devices based on prior observations collected by sensors within the environments and/or on the robotic device. For example, based on a prior history of a user most often playing music using their movable music device after work, the control system may command a robotic device of the user to pick up and transport the moveable music player such that it constantly remains close to the user using wireless Wi-Fi, Bluetooth, RF, or the like upon observing the user entering their home. In some embodiments, the user of the robotic device may instruct the robotic device to do the same using a communication device paired with the robotic device, an interface of the robotic device, or another method for communicating with the robotic device. In another example, a control system may send a command signal using Wi-Fi, Bluetooth, RF, or the like, to one or more robotic devices to transport a refuse waste bin to a collection location upon observing a refuse collection vehicle within a predetermined range of the robotic device. The control system may also send a command signal to the one or more robotic devices to return to their storage location after observing that refuse collection has been completed. In some embodiments, the robotic device may transmit a signal to the control system using Wi-Fi, Bluetooth, RF, or by using other wireless transmission methods.

In some embodiments, a robotic device may learn what items to pick up, distribute, deliver, and/or transport and when to pick up, distribute, deliver, and/or transport items over time based on the history of tasks performed. In some embodiments, the robotic device may autonomously execute tasks based on history of tasks performed. For example, a user may consistently command a robotic device to transport a home assistant around the environment such that the home assistant remains within a predetermined range from the user whenever the user is home. Over time, the robotic device may autonomously transport the home assistant around the environment such that the home assistant remains within a predetermined range from the user upon observing by sensors that the user is home. In another example, a commercial establishment may routinely order certain office supplies from a warehouse that are picked up and delivered by a robotic device of the warehouse. Over time, the robotic device may autonomously deliver the office supplies to the commercial establishment at certain dates and times based on prior history.

In some embodiments, a processor of the robotic device may be provided or may autonomously determine the type and/or characteristics of the one or more items being picked up, distributed, delivered and/or transported. In some embodiments, a user may to indicate to the robotic device the type and/or characteristics of the one or more items using, for example, an application of a communications device, a remote control, an interface of the robotic device or other types of communication methods. A communication device may include, but not limited to, a mobile phone, laptop, tablet, desktop computer, remote control, or any other type of device capable of conveying information to the robotic device. In some embodiments, the robotic device may comprise an object recognition module with an object database and may identify the type and/or characteristics of the one or more items based on an input from sensors. In some embodiments, characteristics of an item may comprise fragility, bulkiness, weight, dimensions, size, shape, stability and the like. In some embodiments, the robotic device may observe the environment using sensors and factor in environmental features such as terrain, elevation, terrain and elevation transitions into the decision-making process of the robotic device when storing, picking up, delivering, distributing and/or transporting items. For example, if the item being transported is fragile the robotic device may alter its path such that the path is along a flat smooth driving surface type and has no elevation changes as rough terrain and elevation changes may increase the risk of damage to the fragile item. As a further example, if a robotic device is transporting an unstable item on a hard floor surface and detects an elevation change due to a transition to carpeted floor type, the robotic device may enact a maneuver change to avoid driving over the edge of the carpet and the item becoming unstable as a result. In some instances, the robotic device may reduce driving speed if the item, for example, is fragile or has low stability. In some embodiments, particular preferences for the operation of the robotic device may be set based on the type of item being transported. For example, the robotic device may be set to only operate on particular types of work surfaces or travel at a particular speed depending on the type of item or items. The settings may be provided to the robotic device through input into an application of a communication device paired with the robotic device, a user interface of the robotic device, a web application paired with the robotic device, or any other communication device capable of communicating with the robotic device. In some embodiments, the robotic device may autonomously adjust its settings based on real-time information from sensors and/or history of previously transported items. For example, sensors of the robotic device may sense in real-time uneven weight distribution indicating instability of an item being transported and may therefore adjust speed and route to reduce the risk of item damage. In another example, a history of previously transported fragile items of a particular size may indicate a particular range of speed for which vibration was minimal and based on this information the robotic device may choose a speed within that range when transporting fragile items of similar size. Over time, the robotic device may autonomously learn using machine learning techniques the best driving settings for different types of items.

In some embodiments, the robotic device may display a status of the robotic device on an interface of the robotic device or any other device paired with the robotic device or may send a status of the robotic device to an application of a communication device paired with the robotic device to provide a user with the status of the robotic device. Communication devices may include, but are not limited to, mobile phone, laptop, tablet, desktop computer, and the like. In other embodiments, the status of the robotic device may be communicated using audio or visual. Examples of statuses and/or messages may include, but is not limited to, leaving storage location, item picked up, item transported, item delivered, in route to specific location, parked at specific location task incomplete, in route to storage location, robotic device stuck, collision with obstruction, device damaged, unable to transport item, and the like. In some embodiments, the robotic device may also communicate an emotion using similar methods. Emotions may comprise happy, sad, satisfied, unsatisfied, angry, conflicted, etc.

In some embodiments, the robotic device may search and locate a particular item and pick up, deliver, transport, and/or distribute the item to one or more locations. In some embodiments, the robotic device may comprise imaging sensors to capture images of objects and an object recognition module to identify the item. In some embodiments, the object recognition module may comprise imaging sensors and an image processor. In some embodiments, the robotic device may be commanded to autonomously search and pick up, deliver, transport, and/or distribute an item using an application of a communication device, voice command, a web application, a user interface of the robotic device or other communication devices capable of communicating with the robotic device. In other embodiments, a robotic device may be navigated around an environment using a communication device while the range of sight of an imaging sensor of the robotic device is displayed on an interface of the communication device. The robotic device may be navigated around the environment in search of an item and upon locating the item may be commanded to pick up, deliver, transport, and/or distribute the item. In embodiments, the communication device may be operated by a user, an operator, a control system, a specialized computer, another robotic device, a machine, etc.

In some embodiments, the item to be transported may be built into the robotic device. For example, items such as a music system, a router, a home or work assistant, a television, or other types of items may be built into the robotic device. In some embodiments, the item may be detachable from the robotic device.

In some embodiments, the robotic may purchase items from a particular location and transport, deliver, and/or distribute the items to one or more locations. In some embodiments, a desired item may be input into an application of a communication device paired with the robotic device and upon receiving the desired item by the robotic device, the robotic device may navigate to a location such as a store or warehouse in which the item is available, purchase the item and transport, deliver, and/or distribute the item to a particular location.

In some embodiments, the robotic device may communicate with other robotic devices within the same environment using collaborative intelligence. An example of a method for collaborative intelligence may be found in U.S. patent application Ser. No. 15/981,643, hereby incorporated by reference in its entirety. In embodiments, a signal sent from another robotic device within the same environment may initiate the robotic device to pick up, transport, deliver, and/or distribute a particular item. For example, a robotic stove may send a signal to a robotic device that carries and transports items when turned on initiating the robotic device to transport a music playing device into the kitchen such that a user may listen to music while cooking. In some embodiments, multiple robotic devices within the same environment may collaborate such that one or more items may be shared among multiple users, consumer homes, commercial establishments, etc. For example, a robotic device may transport a lawn mower between multiple locations such that the device may be shared among multiple consumer homes and/or commercial establishments.

In some embodiments, the robotic device may comprise speech capabilities. For example, the robotic device may be capable of communicating through verbal speech with a user, an operator, another robotic device, a specialized computer, or any other type of device capable of communicating through verbal speech. For example, the robotic device may verbally communicate its status, its emotion, its tasks, general information, concerns, or any other type of information. In some embodiments, the robotic device may understand verbal speech and may respond to, for example, verbal commands, instructions, inquiries, questions, and the like.

In some embodiments sensors of the robotic device may be used to capture images and features of users within an environment and a processor of the robotic device may be used to identify the user. Upon identifying the user particular instructions or commands may be executed by the robotic device and/or settings may be adjusted to those preferred by the identified user. For example, a particular user within a workplace may prefer a specific type of coffee be delivered to their desk in the morning or may prefer specific brands of office supplies delivered to their desk every other week.

In some embodiments, the robotic device may transport items by pushing or pulling them. In some embodiments, the robotic device may comprise a mechanism for pulling and/or pushing items. For example, a robotic device may transport a shopping cart from a first location to a second location by pushing it. In another example, a robotic device may transport a wagon from one location to another by pulling it. In another example, a robotic device may transport a robotic device or other type of device from a first location to a second location by pushing or pulling it.

In some embodiments, the robotic device may be configured or modified to pick up, transport, deliver and/or distribute particular items. For example, a robotic device may be configured with a large flat rectangular platform if the majority of items the robotic device will pick up, transport, deliver and/or distribute are large boxes. In another example, a robotic device may be configured with a smartphone or home assistant charging port if the main function of the robotic device is to transport a smart phone or home assistant around an environment and/or from one location to another.

In embodiments, instructions and user preferences may be provided to the robotic device using one or more of the following: a control system, a user interface of the robotic device, a web application, an application of a communication device, a communication device, and a robotic device.

User preferences may comprise scheduling preferences for item pick up, delivery, transportation, or distribution or task execution, driving preferences, and environmental preferences. Scheduling preferences may comprise, for example, date, time, location, and frequency for item pick up, delivery, transportation, or distribution or execution of a particular task. Tasks may be, for example, keeping the distance of an item within a predetermined range from a user or device at all times or at particular times, storing an item in a particular location, picking up particular items and delivering them to particular locations, buying one or more items, picking up a particular item and delivering it to a user, parking at a particular location, etc. Driving preferences may comprise speed, driving route, etc. and may be different for different items based on their type and/or characteristics. Environmental preferences may comprise preferred weather for item pick up, delivery, transportation, or distribution or task execution, terrain, driving surface elevations, driving surface grades, etc. and may be different for different items based on their type and/or characteristics.

In some embodiments, the robotic device may comprise large bouncy wheels that may be used in overcoming obstacles. In some embodiments, the robotic device may comprise a suspension system, such as for example the suspension system described in U.S. patent application Ser. No. 15/951,096, hereby incorporated by reference in its entirety. In other embodiments, the robotic device may comprise mecanum wheels, such as for example those described in U.S. Patent App. Ser. Nos. 62/664,389, and 15/447,450, hereby incorporated by reference in their entirety.

In some embodiments, the battery of the robotic device may be charged by directly plugging into a socket, or by connecting with a charging station. In some embodiments, the battery of the robotic device may be charged by connecting with a charging station that is powered using solar energy. In some embodiments, the robotic device may comprise solar panels and may be powered using solar energy.

Figure 4:
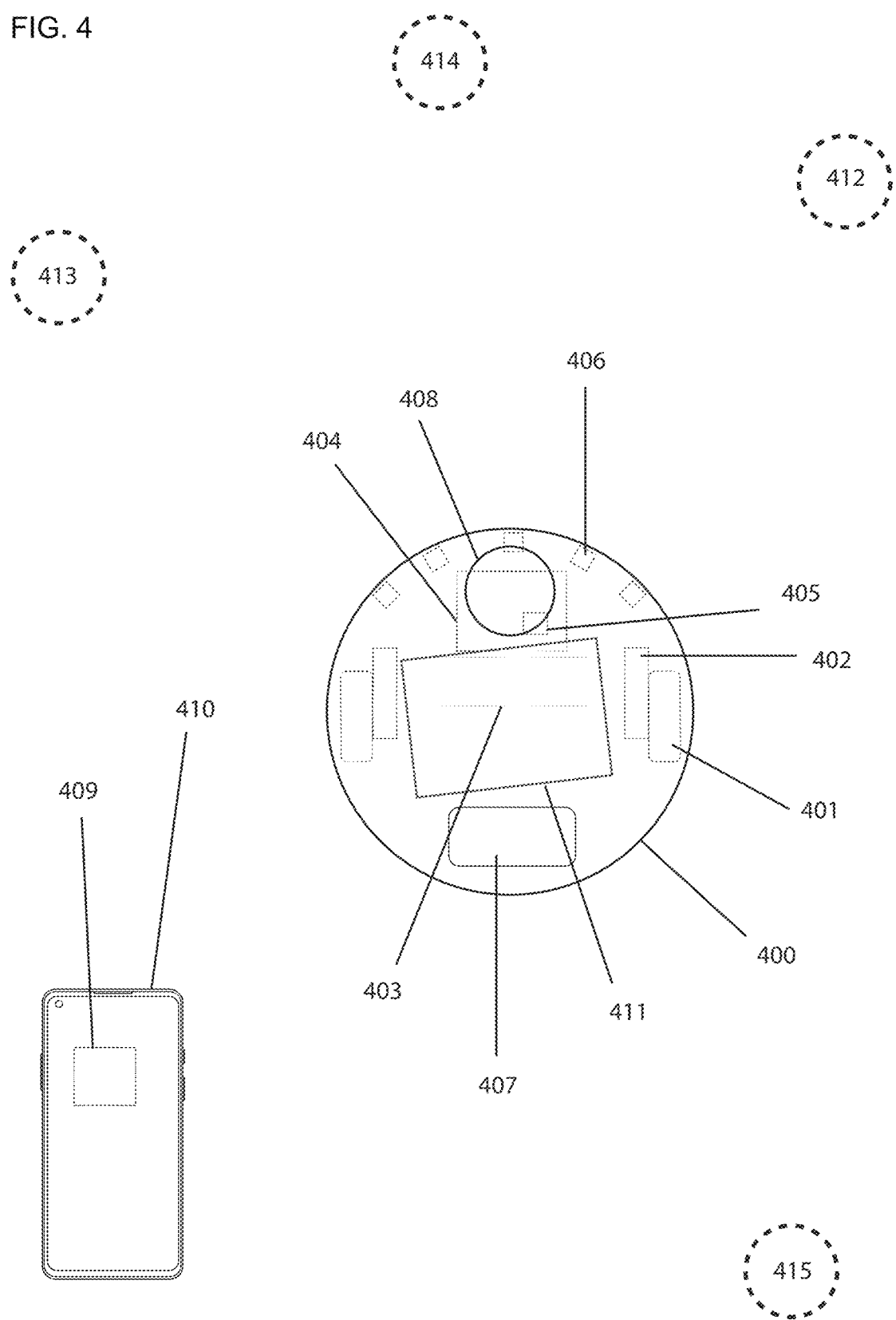
FIG. 4 illustrates an example of a robotic device, according to some embodiments.

FIG. 4 illustrates an example of a robotic device including a chassis 400, a motor 401, a suspension system 402, a rechargeable battery 403, a control system module 404, a processor 405, sensors 406, a user interface 407 and an object recognition module 408. The robotic device may be paired with a mobile or web application 409 accessed on a communication device 410. The application 409 may be used to provide commands to the robotic device. The robotic device may transport an item 411 to any of locations 412, 413, or 414, after which the robotic device may drive to a storage location 415.

The foregoing descriptions of specific embodiments of the invention have been presented for purposes of illustration and description. They are not intended to be exhaustive or to limit the invention to the precise forms disclosed.

The invention claimed is:

1. A method for carrying an item autonomously by a robotic device with a chassis attached to, the robotic device comprising:
 a set of wheels coupled to a motor for driving the set of wheels;
 a rechargeable battery for providing power to the robotic device;
 a control system for controlling movement of the robotic device;
 a set of sensors;
 a processor;
 a container providing space for at least one item being carried;
 an electrical port for providing electricity to at least one compatible device; and
 a memory storing instructions that when executed by the processor effectuates operations, comprising:
  capturing, with a camera of the robotic device, images of an environment;
  extracting, with the processor of the robotic device, features in the captured images;
  generating, with the processor of the robotic device, a map of the environment based on at least some data captured by the camera;
  localizing, with the processor of the robotic device, the robotic device based on at least some data captured by the camera; and
  actuating, with the processor of the robotic device, the carry of the at least one item from a first location to a second location upon receiving a command via a user interface of the robotic device or an application of a communication device configured to:
   receive at least one input designating a command for an instant carry or a schedule for the carry of the at least one item; and
   display the status of the carry.

2. The method of claim 1, wherein the robotic device navigates to a designated location after completion of a work task.

3. The method of claim 1, wherein the application of the communication device is further configured to:
 receive at least one input designating a type or a characteristic of the at least one item being carried.

4. The method of claim 1, wherein the operations further comprise:
 identifying, with the processor of the robotic device, an object type of the objects present along a path of the robotic device based on the features present in the captured images.

5. The method of claim 4, further comprises:
 classifying, with the processor of the robotic device, objects based on features of objects present in previously captured images.

6. The method of claim 5, further comprises:
 marking, with the processor of the robotic device, the objects within the map of the environment.

7. The method of claim 3, wherein the at least one characteristic of the at least one item being carried comprises any of: fragility, bulkiness, weight, size, dimension, shape, and stability.

8. The method of claim 1, wherein the at least one item being carried comprises at least one food or drink item.

9. The method of claim 1, wherein the operations further comprise:
 actuating, with the processor of the robotic device, the robotic device to carry the least one item to the second location upon the robotic device receiving a verbal command to do so.

10. The method of claim 1, wherein possible statuses of a work session comprise one of: leaving a location, item picked up, item in transit, or item arrived.

11. The method of claim 1, wherein possible statuses of a work session further comprise: enroute to the second location, parked at a specific location, parked at a storage location, task incomplete, task complete, enroute to the storage location, stuck, stalled, collision with an obstruction, or robotic device damaged.

12. The method of claim 1, wherein the schedule comprises any of: a pickup location, a delivery location, a delivery day and time, and a delivery frequency.

13. The method of claim 1, wherein the operations further comprise:
determining, with the processor of the robotic device, different driving settings based on characteristics of items to be delivered using machine learning techniques; and
adjusting, with the processor of the robotic device, driving settings of the robotic device based on an item type of the at least one item.

14. The method of claim 1, wherein the operations further comprise:
determining, with the processor of the robotic device, an optimal route from the first location to the second location using machine learning techniques based on observations comprising any of: collision data, stall data, and route data comprising travel time and travel distance of routes.

15. The method of claim 1, wherein the operations further comprise:
actuating, with the processor of the robotic device, the robotic device to receive commands with the communication device.

16. The method of claim 1, wherein the operations further comprise:
learning, with the processor of the robotic device, a route to be taken by the robotic device by a user manually wheeling the robotic device.

17. The method of claim 1, wherein the application of the communication device is further configured to:
display the map of the environment; and
receive at least one input designating a route of the robotic device within the map of the environment.

18. The method of claim 1, wherein the operations further comprise:
determining, with the processor of the robotic device, a likelihood of encountering particular object types in a region based on locations in which the particular object types were previously encountered.

19. The method of claim 1, wherein the operations further comprise:
identifying, with the processor of the robotic device, regions where objects are consistently encountered as high traffic areas;
marking, with the processor of the robotic device, the high traffic areas in the map of the environment; and
altering, with the processor of the robotic device, a route of the robotic device to avoid the high traffic areas.

20. The method of claim 1, wherein the operations further comprise:
inferring, with the processor of the robotic device, a schedule of the robotic device based on previously executed tasks; and
actuating, with the processor of the robotic device, the robotic device to execute the inferred schedule.

21. The method of claim 1, wherein the operations further comprise:
extracting, with the processor of the robotic device, human features of users captured in the images;
identifying, with the processor of the robotic device, a particular user based on the human features extracted; and
actuating, with the processor of the robotic device, the robotic device to execute a particular action upon identifying the particular user.

22. The method of claim 1, wherein the operations further comprise:
determining, with the processor of the robotic device, an item type of the at least one item based on at least some data captured by the set of sensors.

23. A robotic device with a chassis attached to, comprising:
a set of wheels coupled to a motor for driving the set of wheels;
a rechargeable battery for providing power to the robotic device;
a control system for controlling movement of the robotic device;
a set of sensors;
a processor; and
a memory storing instructions that when executed by the processor effectuates operations, comprising:
capturing, with a camera of the robotic device, images of an environment;
extracting, with the processor of the robotic device, features in the captured images;
generating, with the processor of the robotic device, a map of the environment based on at least some data captured by the camera; and
localizing, with the processor of the robotic device, the robotic device based on at least some data captured by the camera; and
actuating, with the processor, to navigate in a work session upon receiving a command;
wherein the robotic device comprises a port for providing electricity to at least one compatible communication device.

24. The method of claim 23, wherein the operations further comprise:
learning, with the processor of the robotic device, a route to be taken by the robotic device by a user manually wheeling the robotic device.

25. A tangible, non-transitory, machine-readable medium storing instructions that when executed by a processor of a robotic device effectuate operations comprising:
capturing, with a camera of the robotic device, images of an environment;
extracting, with the processor of the robotic device, features in the captured images;
generating, with the processor of the robotic device, a map of the environment based on at least some data captured by the camera;
localizing, with the processor of the robotic device, the robotic device based on at least some data captured by the camera;
actuating, with the processor of the robotic device, a movement upon receiving a command via a user interface of the robotic device or an application of a communication device, wherein the robotic device comprises at least an electrical port for providing electricity to at least one compatible device; and
actuating, with the processor of the robotic device, to navigate in a work session upon receiving the command.

26. The medium of claim 25, wherein:
the operations further comprise:
identifying, with the processor of the robotic device, an object type of the objects present along a path of the robotic device based on the features present in the images captured by the camera; and classifying, with the processor of the robotic device, objects based on features of objects present in previously captured images.

27. The medium of claim 26, wherein the operations further comprise:
marking, with the processor of the robotic device, the objects within the map of the environment.

28. The medium of claim 26, wherein the operations further comprise:
storing and accessing, with the processor of the robotic device, an internal database of obstacles previously encountered by the robotic device with the environment.

29. The medium of claim 26, wherein the operations further comprise:
generating, with the processor of the robotic device, multiple maps of the environment, wherein the maps may be combined with previously generated maps of the environment to provide an updated map to the user.

30. An apparatus for providing electricity to at least one compatible device comprising:
a robotic device, comprising:
a set of wheels coupled to a motor for driving the set of wheels;
a rechargeable battery for providing power to the robotic device;
a control system for controlling movement of the robotic device;
a set of sensors;
a processor; and
a memory storing instructions that when executed by the processor effectuates operations, comprising:
capturing, with a camera of the robotic device, images of an environment;
extracting, with the processor of the robotic device, features in the captured images;
generating, with the processor of the robotic device, a map of the environment based on at least some data captured by the camera; localizing, with the processor of the robotic device, the robotic device based on at least some data captured by the camera; and
actuating, with the processor of the robotic device, a movement upon receiving a command via a user interface of the robotic device or an application of a communication device, wherein the robotic device comprises at least an electrical port for providing electricity to at least one compatible device; and
actuating, with the processor of the robotic device, to navigate in a work session upon receiving the command.

* * * * *